(12) United States Patent
Baudesson et al.

(10) Patent No.: US 7,499,296 B2
(45) Date of Patent: Mar. 3, 2009

(54) ELECTRIC POWER CONVERTER DEVICE WITH CONTROL MEANS AND PROCESS AND CONVERTING POWER

(75) Inventors: Philippe Baudesson, La Buisse (FR); François Bouvet, Grenoble (FR); Antonio Almeida, Voreppe (FR); Jean Noel Fiorina, Sillans (FR)

(73) Assignee: MGE UPS Systems, Saint-Ismiers Cedex (FR)

( * ) Notice: Subject to any disclaimer, the term of this patent is extended or adjusted under 35 U.S.C. 154(b) by 426 days.

(21) Appl. No.: 11/219,779

(22) Filed: Sep. 7, 2005

(65) Prior Publication Data

US 2006/0077701 A1 Apr. 13, 2006

(30) Foreign Application Priority Data

Sep. 27, 2004 (FR) .................................. 04 10168

(51) Int. Cl.
*H02M 5/45* (2006.01)
*H02M 1/12* (2006.01)
(52) U.S. Cl. .............................. 363/37; 363/41; 363/98

(58) Field of Classification Search .................... 363/37, 363/40, 41, 45, 46, 47, 48, 56.02, 98, 132
See application file for complete search history.

(56) References Cited

U.S. PATENT DOCUMENTS

| 5,654,591 | A | 8/1997 | Mabboux et al. .............. 307/66 |
|---|---|---|---|
| 5,671,130 | A * | 9/1997 | Kerkman et al. .............. 363/41 |
| 5,889,661 | A | 3/1999 | Tamura et al. ................. 363/37 |
| 6,271,633 | B1 | 8/2001 | Shen et al. ............... 315/209 R |
| 6,639,371 | B2 * | 10/2003 | Walters et al. ............... 318/254 |
| 6,653,812 | B1 * | 11/2003 | Huo et al. ...................... 363/40 |
| 2002/0180379 | A1 | 12/2002 | Shen ........................... 315/224 |
| 2003/0155893 | A1 | 8/2003 | Schreiber ..................... 322/12 |

* cited by examiner

*Primary Examiner*—Jessica Han
(74) *Attorney, Agent, or Firm*—Steptoe & Johnson LLP (57) ABSTRACT

An electric power converter with a control device that comprises a processing unit receives control signals and sends modulated signals to inverter stages of the electric power converter. The control device also controls a common stage of the electronic power converter, which is connected between power lines and a common neutral connection. The signals to the common stage are outputted based on inputs from a modulation signal and a reference voltage signal.

15 Claims, 9 Drawing Sheets

ELECTRIC POWER CONVERTER DEVICE WITH CONTROL MEANS AND PROCESS AND CONVERTING POWER

BACKGROUND OF THE INVENTION

The invention relates to a control device of an electric power converter comprising control means for controlling semi-conductor stages.

STATE OF THE ART

Known electric power converters are used in particular in uninterruptible power supplies and speed regulators for electric motors or associated with power generators for coupling to a power distribution system. Such a converter 1 represented in FIG. 1 generally comprises DC voltage VDC lines L1 and L2 and an inverter 2 formed by three power semi-conductor stages 2A, 2B, and 2C, connected between the lines L1 and L2 to supply output AC voltages VO to a load 3 or to an electric power distribution system. When the stages are controlled in high frequency, in particular in pulse width modulation, electric filters 4 can be fitted between the outputs of the legs 2A, 2B, 2C and the load 3 or power system. Often a rectifier 5 connected between AC inputs VI and the lines L1 and L2 supplies the DC voltage VDC. Capacitors C1 and C2 connected to the lines L1 and L2 perform filtering of the DC voltage VDC.

Figure 2:
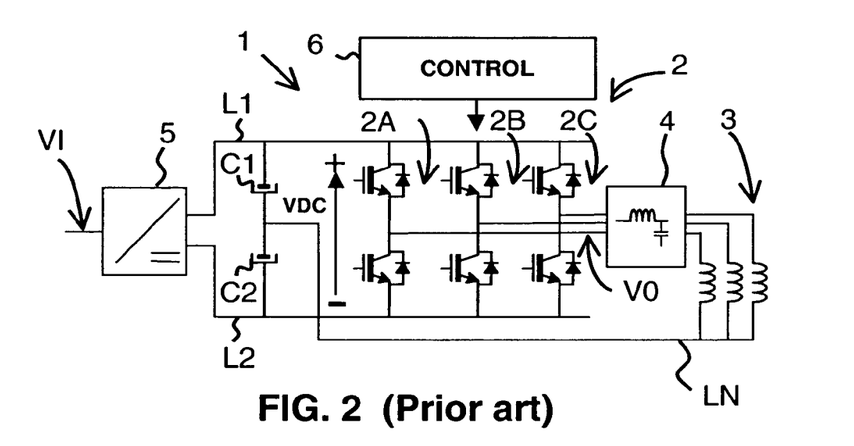

When the load is unbalanced, a neutral conductor has to be distributed on output to ensure correct voltages. In FIG. 2, the load comprises a neutral conductor LN connected to a mid-point of the filtering capacitors C1 and C2. These capacitors generally have very high capacitance values to ensure a good stability of the voltage even with very strong neutral currents. A control device 6 controls the semi-conductors of the legs to supply AC voltages referenced notably with respect to the neutral conductor.

Figure 3:
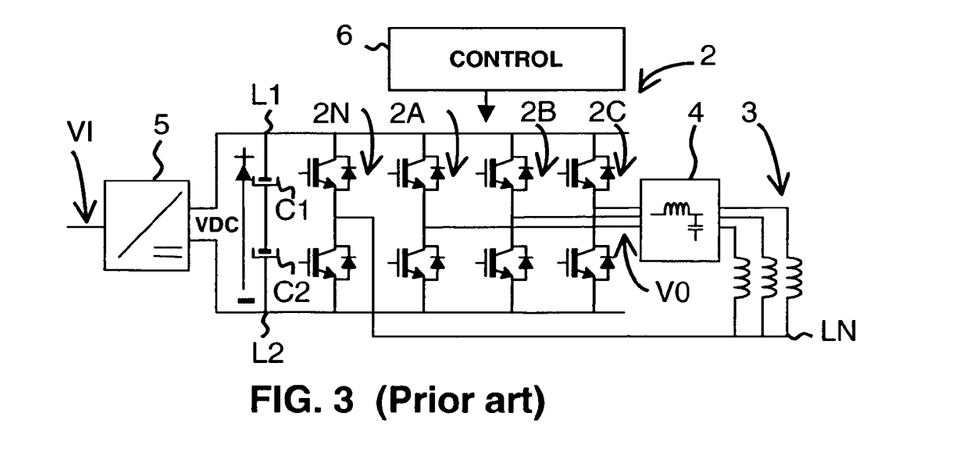

To increase the control level of the neutral current and voltage, in particular in the case of over-modulation of control of the leg of the inverter 2, the neutral line LN can be connected to a fourth leg 2N of the inverter 2. In FIG. 3, the leg 2N is connected like the other legs between the DC voltage lines L1 and L2.

Figure 4:
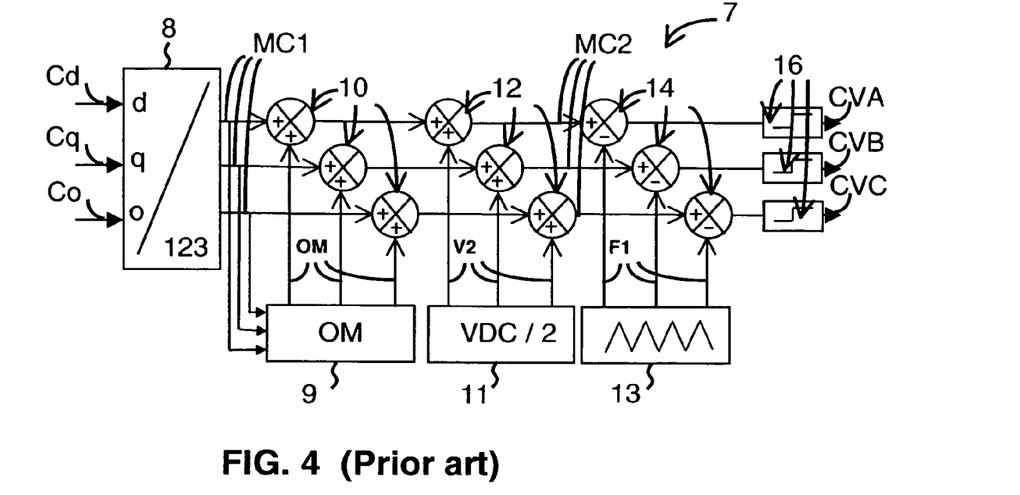
FIG. 4 represents a block diagram of a control device of known type.

FIG. 4 shows an example of a part of a processing unit 7 of a control circuit 6 to supply control signals of the legs. In this circuit, a regulator 8 enables three-phase modulation signals to be regulated and supplied according to reduced setpoints Cd, Cq, Co, notably by a Park or Concordia transformation in the domains dqo or αβo. These known transformations and rotations are generally computed by means of matrices respectively called Park and Concordia matrices. Signals MC1 for each phase on output from the regulator are preferably used for modulation of intersecting type on a triangular high-frequency carrier signal enabling pulse width modulation. In the diagram of FIG. 4, the regulator 8 supplies first three-phase modulation signals MC1, a module 9 determines over-modulation signals OM to be applied to the first signals MC1 with operators 10, a module 11 applies a reference voltage V2 to said signals MC1 by operators 12, and a module 13 supplies a high-frequency signal designed to be modulated by modulation signals MC2 modified by the operators 10 and 12. Operators 14 combine the modulation signals MC2 with preferably triangular high-frequency signals F1 to supply control signals CVA, CVB and CVC of the inverter legs 2A, 2B, 2C in pulse width modulation format. As the leg controls are preferably binary on-off controls, a conditioning circuit 16 shapes the control signals. The over-modulation signals OM are generated by the modulation signals MC1 and by the type of over-modulation. The reference signal V2 is generally representative of a DC voltage, for example half the voltage VDC of the lines L1 and L2.

Figure 5:
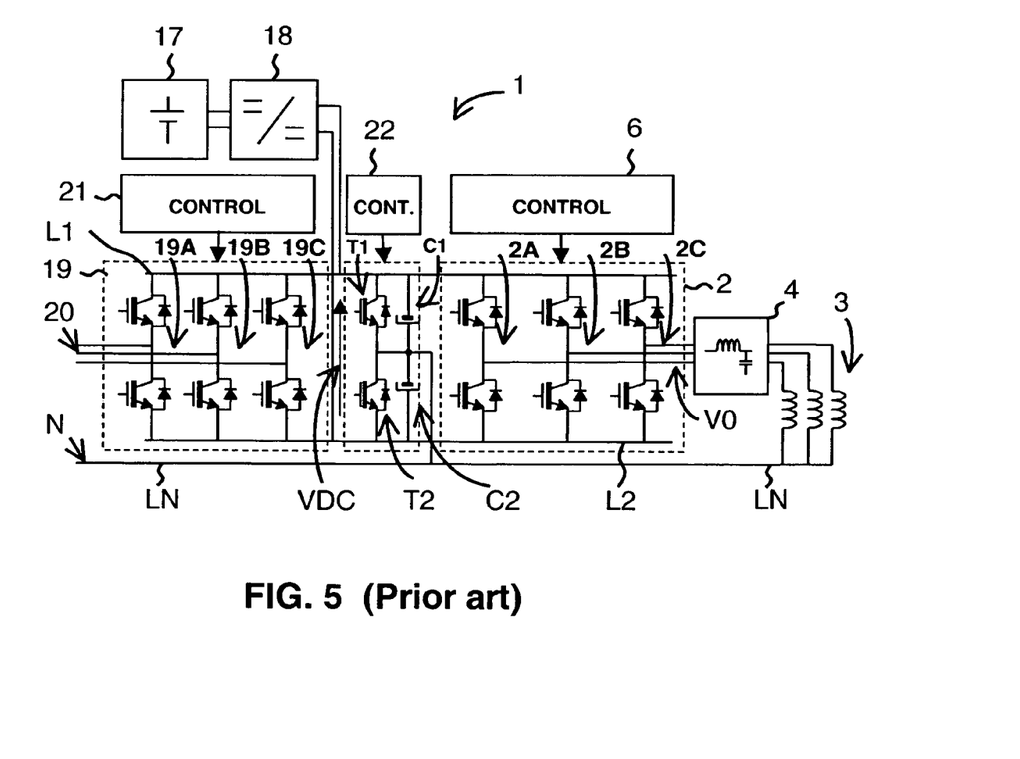
FIG. 5 represents a diagram of a converter with through neutral of known type.

FIG. 5 represents a known converter with common neutral or through neutral. This converter used as an uninterruptible power supply comprises a battery 17 connected via an adapter 18 to the DC voltage lines L1 and L2. In known manner, this converter comprises a rectifier 19 with three legs 19A, 19B and 19C connected to AC voltages or current inputs 20 and to the DC voltage VDC lines L1 and L2. A control circuit 21 of the rectifier controls the rectifier legs according to the DC voltage VDC and the currents to be taken from a power system connected on input 20. The filtering capacitors have a common point connected to the through neutral line LN. The voltage of the common point of the capacitors is generally a mid-point voltage between the lines L1 and L2 the value whereof is regulated by voltage-regulating semi-conductors T1 and T2 controlled by a regulation control circuit 22. In this figure, an inverter of the same type as that of FIG. 2 is connected on the lines L1 and L2 and to the mid-point of the capacitors.

Figure 1:
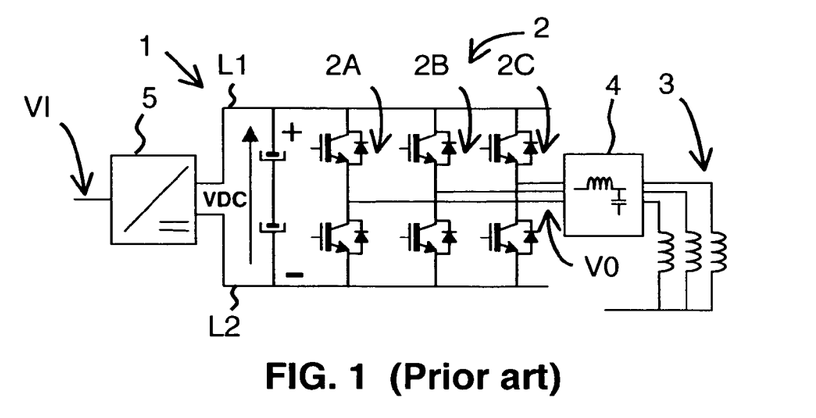
FIGS. 1 to 3 represent diagrams of converters with inverters of known types.

In converters without a mid-point on the capacitors, in particular in the three-phase or three-phase plus independent neutral converters of FIGS. 1 and 3, the capacitors do not need to be of very high capacitance values. In the converters of the type of that of FIG. 2, when the neutral is connected to a common point of the capacitors C1 and C2, the value of the capacitors is high to absorb the neutral currents without disturbing the DC voltage VDC too much. However, in converters with a through neutral LN between inputs connected to a rectifier and outputs of an inverter as that of FIG. 5, the value and size of the filtering capacitors C1 and C2 can become very high. The high values of the capacitors are due in particular to the filtering and to absorption of the neutral currents of the load supplied by the inverter and the neutral currents of the source supplying the rectifier. High capacitance values of the capacitors in this case enable an independence between the structures of the inverter and those of the rectifier to be ensured. Thus, strong neutral currents on the inverter side have little disturbance effects on the rectifier or on the source currents.

Known state-of-the-art devices with through neutral such as that of FIG. 5 have very high capacitor capacitance balues which imply very considerable costs when the converter power is high. In addition, in such a converter, coupling of the neutral currents does not enable the power in the semi-conductors to be reduced by over-modulation on the controls of the inverter and rectifier legs, or stages, when the currents are unbalanced. The lack of over-modulation in the controls causes a power loss on switching of the semi-conductors and imposes a higher DC voltage and a lower electrical efficiency of the converter. Fitting additional neutral, or stages, for the four-arm inverter and rectifier is not possible with a through neutral as known control devices do not enable neutral current of the inverter and rectifier to be controlled in sufficiently independent manner to limit coupling between the rectifier, the inverter and the DC voltage lines.

SUMMARY OF THE INVENTION

The object of the invention is to provide a control device and process of an electric power converter and a converter comprising such a device enabling the problems of state-of-the-art converters with through neutral to be overcome.

In a control device according to a first embodiment of the invention, an electric power converter device comprises semiconductor stages, and control means that control the semiconductor stages. A rectifying means receives an input electric voltage or current and outputs a DC voltage to intermediate DC voltage lines. A DC voltage filtering means is connected to the intermediate lines. A conversion means converts the DC voltage into AC voltage outputs. The conversion means has at least two stages connected between the DC voltage lines and outputs. A common neutral or earth conductor is connected between the input and at least one output. A common stage comprising electronic power components is connected between the intermediate DC voltage lines and the common neutral conductor.

Control means control said stages of the conversion means, and comprise processing means. The processing means have means for determining a common control component which is used to output a common control signal for over-modulating the electric power converter.

The processing means further receive control signals corresponding to the stages of the conversion means, apply a reference voltage to the control signals, modulate the control signals, and output modulated control signals to the stages of the conversion means. The processing means also output a control signal to the common stage. The control signal is based on the reference voltage and the common control component signal. The reference voltage has a value between voltage values of the respective intermediate DC voltage lines.

In another aspect, the control means control stages of the conversion means, stages of the rectifying means, and the common stage; the processing means supply modulation signals for each stage according to signals corresponding to the reference voltage; and the modulation signals modulate carrier signals with similar characteristics for each stage.

In another aspect, the signals corresponding to the reference voltage are the same for each modulated stage of the converter and the carrier signals are the same for each stage of the converter.

In another aspect, the common control component signal corresponds to first modulation signals of the stages of the conversion means; and the common control component signal corresponds to modulation signals of the stages of the conversion means and a modulation signal of the common stage.

In another aspect, the processing means receive the common control component signal as an input and process modulation signals of the stages of the rectifying means.

In another aspect, the processing means comprise correction means that correct the control component signal according to signals corresponding to saturation of the first modulation signals of the rectifying means.

In another aspect, the correction means predict saturation values and reduce a signal that corresponds to the control component signal according to the saturation values.

In another aspect, an electric power converter comprises rectifying means for receiving an electric voltage or current on inputs and supplying a DC voltage to intermediate DC voltage lines. A DC voltage filtering means is connected to the intermediate lines. Conversion means convert the DC voltage into output AC voltages and have at least two stages connected between the DC voltage lines and outputs. A common neutral conductor, ground, or earth is connected between an input and an output. A common stage having electronic power components is connected between the intermediate DC voltage lines and the common connection. And control means control the stages of the conversion means and comprise processing means for supplying modulated signals to the stages of the conversion means.

In another aspect, the modulated signals supplied from the processing means to the stages of the conversion means correspond to voltages different from the respective input voltages of the rectifying means.

In another aspect, the modulated signals supplied to the stages of the conversion means have a different fundamental frequency from the fundamental frequency of the input voltage signal of the rectifying means.

In another aspect, the modulated signals supplied to the stages of the conversion means have different phases from the phases of the input voltage of the rectifying means.

In yet another aspect, the control means control the stages of the conversion means and the stages of the rectifying means in reversible manner, so that outputs to a load become power inputs, the conversion means become rectifying means, and the inputs become outputs to supply AC electric power.

In another aspect, a control process of an electric power converter comprises receiving an electric input voltage or current at a rectifying means. The electric input voltage or current is then rectified with the rectifying means. The rectifying means supply a DC voltage to intermediate DC voltage lines. A DC voltage filtering means connected to the intermediate lines filter the DC voltage. The DC voltage is converted into output AC voltages with a conversion means having at least two stages connected between the intermediate DC voltage lines and outputs. A common neutral conductor, ground, or earth connection is connected between an input and an output. A common stage, comprising electronic power components, is connected between the intermediate DC voltage lines and the common neutral conductor, ground, or earth connection. A control means controls the stages of the conversion means via a processing means via modulated signals. The modulated signals of control signals are supplied to the stages of the conversion means and the common stage.

The process of the processing means includes determining first modulation signals for controlling the stages of the conversion means. A reference voltage is applied to a modulation signal of the common stage and to modulation signals for controlling stages of the conversion means. A common control component value is determined. And the common control component is supplied to the common stage modulation signal and to modulation signals for controlling stages of the conversion means.

In another aspect, the process of the processing means includes applying a reference voltage and a common control component value to modulation signals for controlling stages of the rectifying means.

In another aspect, the process of the processing means comprises detecting saturation of modulation signals for controlling stages of the rectifying means, and correcting the common control component value according to the detection of saturation of the modulation signals of the stages of the rectifying means.

BRIEF DESCRIPTION OF THE DRAWINGS

Other advantages and features will become more clearly apparent from the following description of particular embodiments of the invention, given as non-restrictive examples only and represented in the accompanying drawings in which.

DETAILED DESCRIPTION OF PREFERRED EMBODIMENTS

Figure 6:
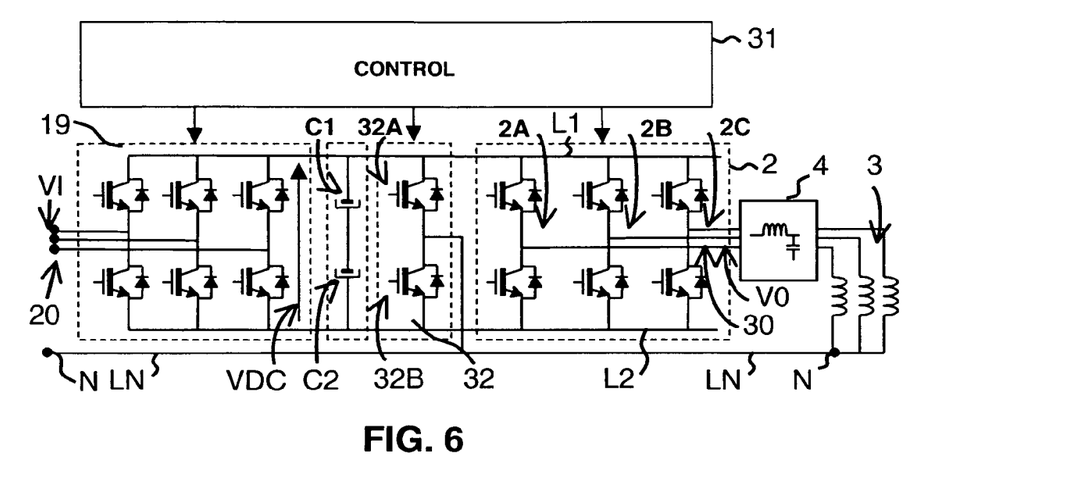
FIG. 6 represents a diagram of a converter according to an embodiment of the invention.

The electric power converter represented in FIG. 6 comprises:
- a rectifier 19 to receive an electric voltage VI or current on inputs 20 and to supply a DC voltage VDC on intermediate DC voltage lines L1 and L2,
- DC voltage filtering capacitors C1 and C2 connected on the intermediate lines,
- conversion means such as an inverter 2 having at least two legs 2A, 2B and 2C connected between said DC voltage lines L1 and L2 and outputs 30 to convert said DC voltage into output AC voltages VO,
- a common neutral conductor N or reference connection LN, and
- a control device 31 controlling turn-on of the legs 2A, 2B, 2C of said conversion means 2 and comprising a processing circuit 7 to supply modulation signals MC2 of control signals CVA, CVB, CVC of said legs.

In this electric power converter according to an embodiment of the invention, the converter comprises a common leg 32 comprising electronic power components 32A and 32B connected between said intermediate DC voltage VDC lines L1 and L2 and the common neutral connection LN. The additional common leg 32 enables the neutral currents to be controlled enabling an additional control level in order to reduce the size of the capacitors. Advantageously, the neutral currents flowing in this additional leg also enable controlled over-modulation to be introduced and the voltage of the DC voltage line to be reduced to reduce losses by switching. The control device 31 controls said common leg 32 according to a modulation signal MCom of said common leg determined with a reference voltage setpoint V2. The common leg modulation signal MCom modulates a carrier signal F1 that is preferably close to or similar to a carrier signal F1 used for control of the inverter legs and of the rectifier legs.

The reference voltage setpoint V2 for modulation signals of the common leg is preferably close to or similar to reference voltage setpoints V2 for modulation signals of legs of the inverter 2 and rectifier 19.

Thus, control of the common leg, control of the inverter legs and control of the rectifier legs have the same carrier signal F1 and reference voltage setpoint V2 bases. With such bases, the modulation signals representative of the rectifier input voltage and the inverter output voltage can be independent as the neutral currents able to flow in the common leg are synchronized by the carrier signal F1. In this case, even with a through neutral, the characteristics of the input power system voltages and currents can be different from the characteristics of the inverter output voltages. For example, the output voltage VO of the inverter can have a different voltage value from the voltage VI of the input power system, but also a different phase or a different frequency.

In a particular embodiment of the invention, this converter with through neutral can also operate in reversible manner. In this case, the control device controls turn-on of the inverter legs and rectifier legs in reversible manner. Outputs to a load then become power inputs, the inverter becomes a rectifier, and the inputs become outputs to supply AC electric power.

Figure 7:
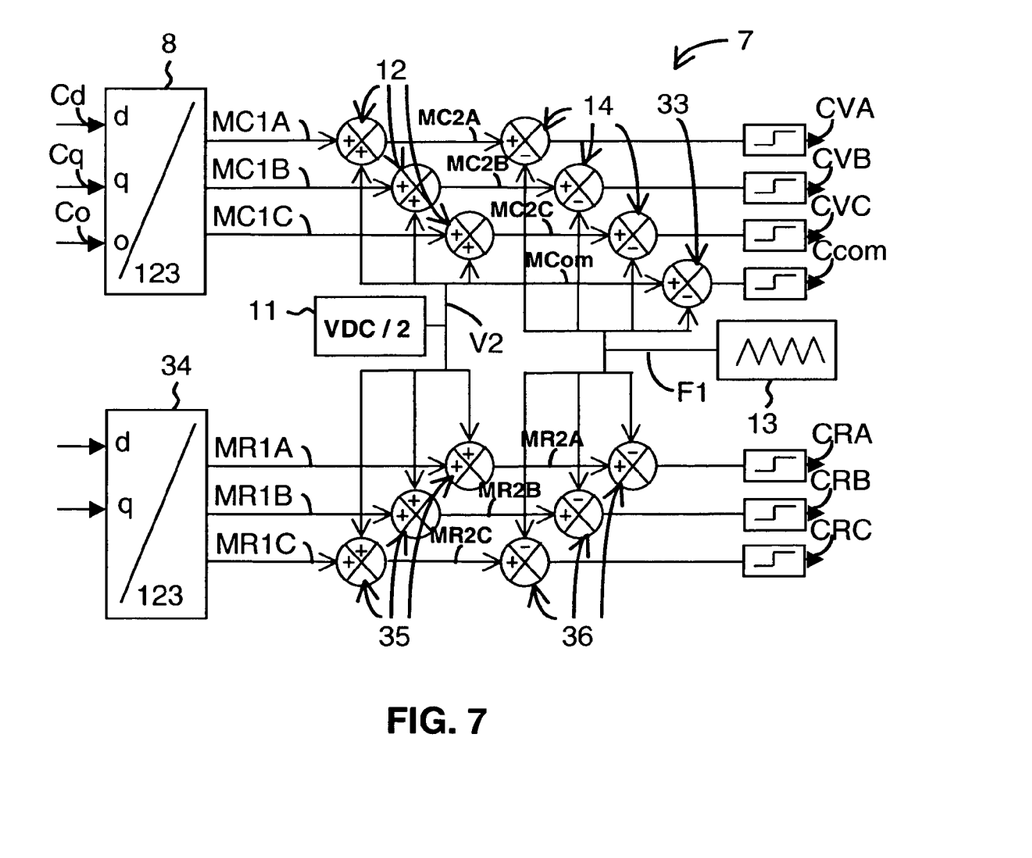
FIGS. 7 to 9 represent block diagrams of alternative embodiments of a processing unit of control devices according to an embodiment of the invention.

FIG. 7 represents a block diagram of a processing unit 7 of a control circuit 6 of a control device according to an embodiment of the invention. The control device is designed in particular to control turn-on of legs of semi-conductors of an electric power converter according to FIG. 6.

The control circuit controls turn-on of the inverter legs 2A, 2B, 2C and comprises a processing unit 7 to supply modulation signals MC2A, MC2B and MC2C of control signals CVA, CVB, CVC of said legs.

According to an embodiment of the invention, the control circuit controls a common leg 32 comprising electronic power components 32A and 32B connected in series between said intermediate DC voltage VDC lines L1 and L2 and connected to the common neutral connection LN by their common mid-point. The processing unit modulates said common leg according to a modulation signal Mcom determined with a reference voltage setpoint V2. The common leg modulation signal Mcom is combined in an operator 33 to modulate a carrier signal F1.

In the diagram of FIG. 7, a regulator 8 supplies first three-phase modulation signals MC1A, MC1B and MC1C of the inverter 2, and a second regulator 34 supplies first three-phase modulation signals MR1A, MR1B, MR1C of the rectifier 19. The first inverter modulation signals are combined in operators 12 with a reference voltage setpoint V2 to supply second modified inverter modulation signals respectively MC2A, MC2B, MC2C. The first rectifier modulation signals are combined in operators 35 with a reference voltage setpoint V2 to supply second modified rectifier modulation signals respectively MR2A, MR2B, MR2C. The modified modulation signals MR1A, MR1B, MR1C and MC2A, MC2B, MC2C are combined in operators respectively 14 and 36 to modulate carrier signals F1. For modulation of the inverter legs, the rectifier legs and the common leg, the setpoint V2 applied to the operators 12, 35, 33 is of the same nature and the carrier F1 applied to the operators 14, 36 and 33 is of the same nature. Advantageously, the same voltage V2 is applied to the operators 12, 35 and 33, and/or the same carrier signal F1 is applied to the operators 14, 36 and 33. Modulated signals CVA, CVB, CVC are designed for control of the inverter legs, modulated signals CRA, CRB, CRC are designed for control of the rectifier legs and a signal Ccom is designed for control of the common leg.

Modulation of the signals is preferably in pulse width modulation modulated for example in the operators 14, 36 and 33 according to a method called intersecting.

Figure 8:
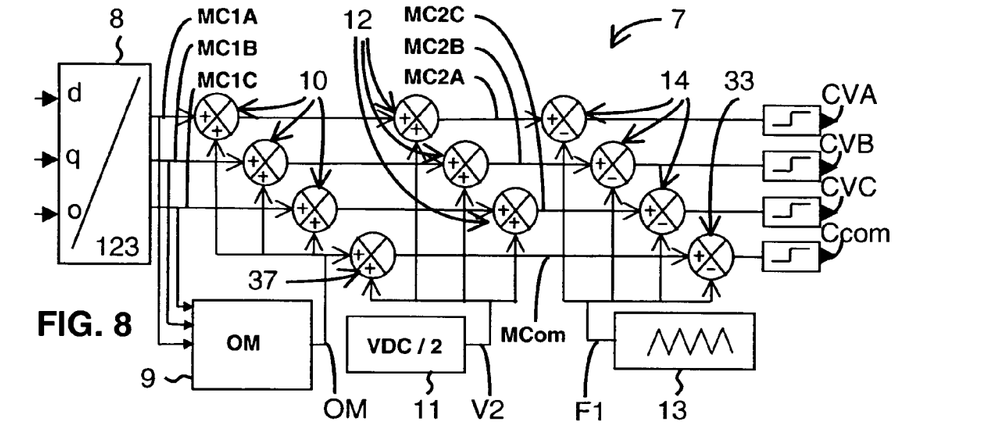

FIG. 8 represents a block diagram of a control circuit 6 of a control device with an over-modulation function. In this diagram, a module 9 receives the first inverter modulation signals MC1A, MC1B, MC1C supplied by the regulator and determines a general control component OM comprising over-modulation and control signals of the common leg 32. This component OM is combined with the first inverter modulation signals MC1A, MC1B, MC1C in operators 10 and combined with the reference voltage setpoint signal V2 in an operator 37 to supply a common leg modulation signal MCom.

Figure 9:
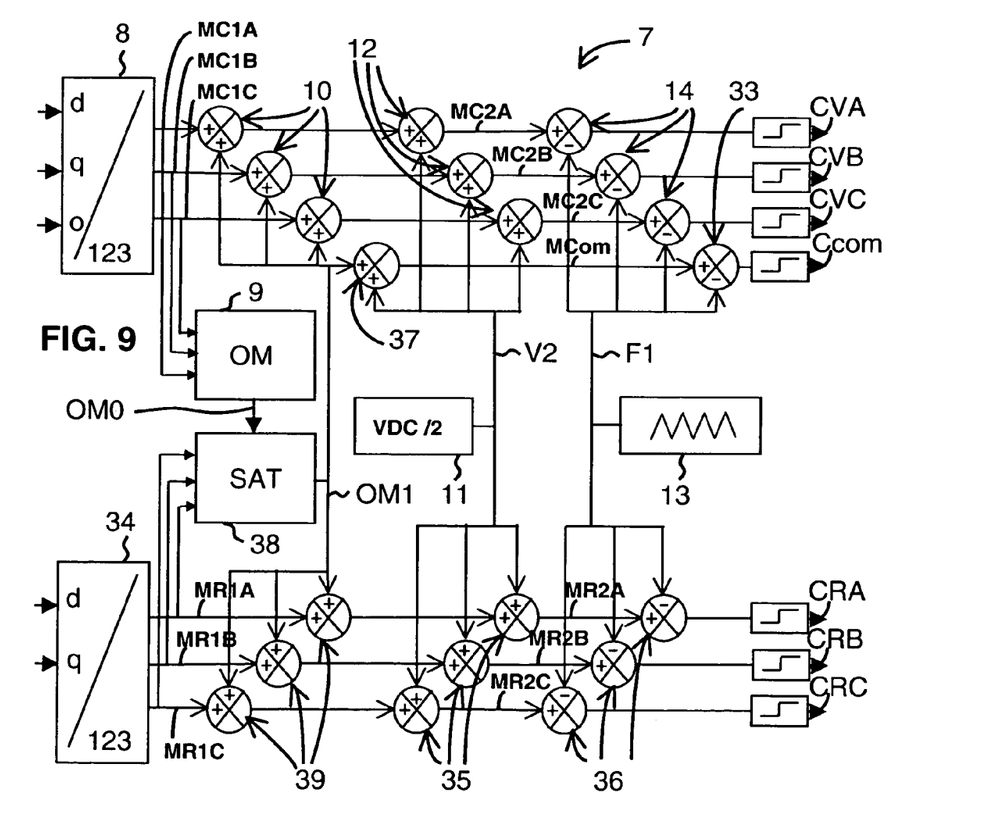

To prevent disturbances of the neutral currents, a signal representative of the general control component is also applied for processing of the rectifier modulation signals. But, as the voltages, frequencies and phases can be different between the input and output of the converter and the voltage of the intermediate DC voltage must remain limited so as not to increase the dissipated power, there is a risk of saturation of the leg control signals. Thus, the control device of FIG. 9 comprises a saturation detection module 38. The module 38 receives the first rectifier leg modulation signals MR1A, MR1B, MR1C and a first general control component signal OM0. The module 38 detects a risk of saturation and corrects the general control component signal OM0 according to an overshoot of a limit saturation value. On output of the module 38, a new corrected general control component signal OM1 is combined with the first inverter leg modulation signals in operators 10, with the first rectifier leg modulation signals MR1A, MR1B, MR1C in operators 39, and with the reference voltage signal V2 in an operator 37 for control of the common leg. Preferably, the inverter leg modulation signals are also combined in operators 12 with the reference voltage signal V2 and in operators 14 with a carrier signal F1, and the rectifier leg modulation signals are also combined in operators 35 with the reference voltage signal V2 and in operators 36 with a carrier signal F1. The operator 37 supplies a common leg modulation signal Mcom resulting from the corrected general control component OM1 and from the reference voltage signal V2. The signal Mcom is combined with the carrier signal in the operator F1.

Figure 10:
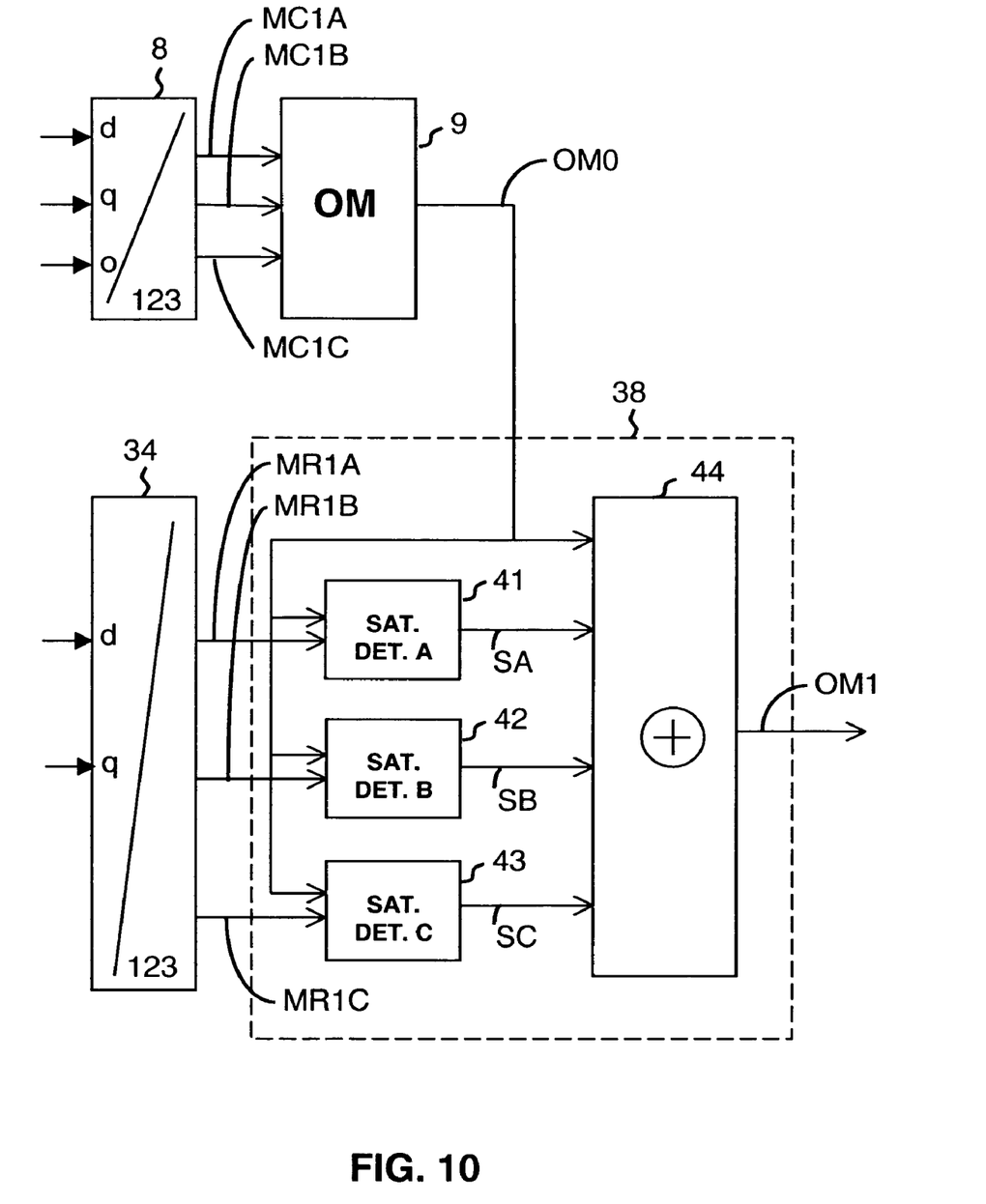
FIG. 10 represents a block diagram of a correction module of a general control component for a control device according to an embodiment of the invention.

FIG. 10 represents an example of a block diagram of a general control component correction module 38. Said general control component is corrected according to signals representative of saturation of the modulation signals of the rectifying means. The module 38 comprises saturation value determination modules 41, 42, 43 respectively SA, SB, SC for each rectifier leg modulation signal. The modules 41, 42, 43 receive on input the first rectifier modulation signals respectively MR1A, MR1B, MR1C and the first general control component signal OM0 and supply saturation value signals respectively SA, SB, SC on output. If a risk of saturation is detected, the first general control component signal and the saturation overshoot value signals SA, SB, SC are combined in an operator 44 to correct the first general control component signal and to supply a new signal, or a new value OM1 of a general control component. For example, the modules 41, 42, and 43 determine or forecast saturation values SA, SB, SC and the operator 44 reduces a signal representative of the general control component OM1 according to said saturation values.

In a device according to an embodiment of the invention, the general control component, the carrier signal and/or the reference voltage signal are common to all the processing of the inverter legs, the rectifier legs and the common leg. However, the processing unit can supply inverter leg modulation signals having different voltages from the corresponding voltages of the rectifier input voltages and/or inverter leg modulation signals having a different fundamental frequency from the fundamental frequency of the rectifier input voltage and/or inverter leg modulation signals having different phases from the phases of the rectifier input voltage.

Figure 11:
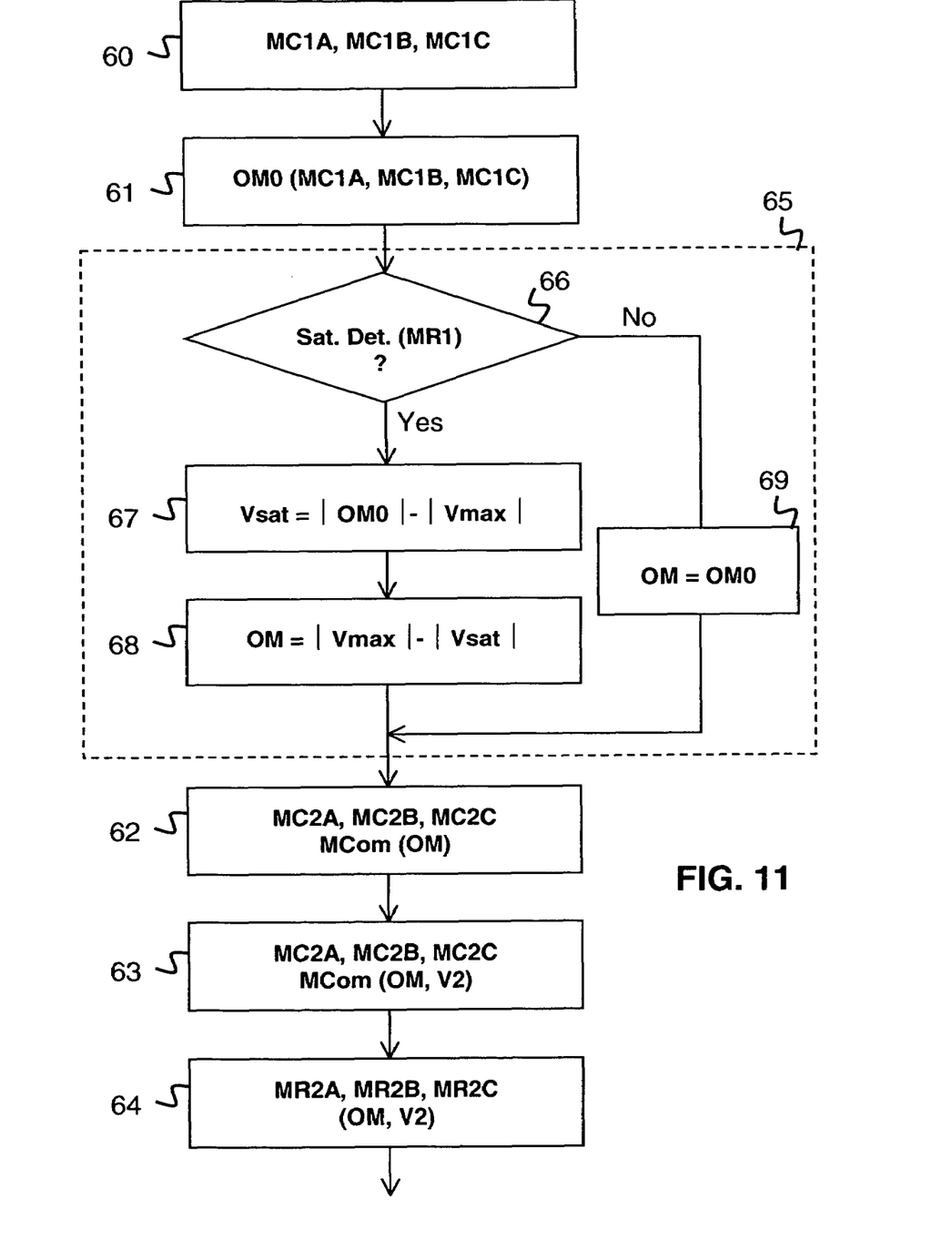
FIG. 11 represents a flowchart according to an example of a process according to the invention.

FIG. 11 represents an example of a flowchart of a control process of an electric power converter according to the invention. The process comprises a first determination step 60 of determining modulation signals MC1A, MC1B, MC1C for control of the inverter legs. Then, a second determination step 61 determines a general control component value OM0 according to the first inverter modulation signals and possibly to the type of over-modulation selected. In a step 62, a value representative of said general control component is applied to said inverter and common leg modulation signals. A step 63 enables a reference voltage setpoint V2 to be applied to the inverter leg modulation signals MC1A, MC1B, MC1C and to a common leg modulation signal Mcom. A third determination step 64 determines modulation signals for rectifier leg control according to a reference voltage setpoint V2 and to a general control component value OM.

In this flowchart, a saturation management phase 65 comprises general control component correction steps in case of risks of saturation of the rectifier leg control. In this phase, a detection step 66 detects a risk of saturation of general control component modulation signals of the rectifier leg control, a step 67 determines a saturation overshoot value Vsat by evaluating said overshoot of a first value of the general control component OM0 with a limit saturation value Vmax. Then a correction step 68 corrects the general control component value OM according to detection of saturation Vsat of rectifier leg modulation signals. If saturations are not detected, the general control component OM is not corrected and a step 69 applies the first value of the general control component OM0 to the component OM.

Figure 12:
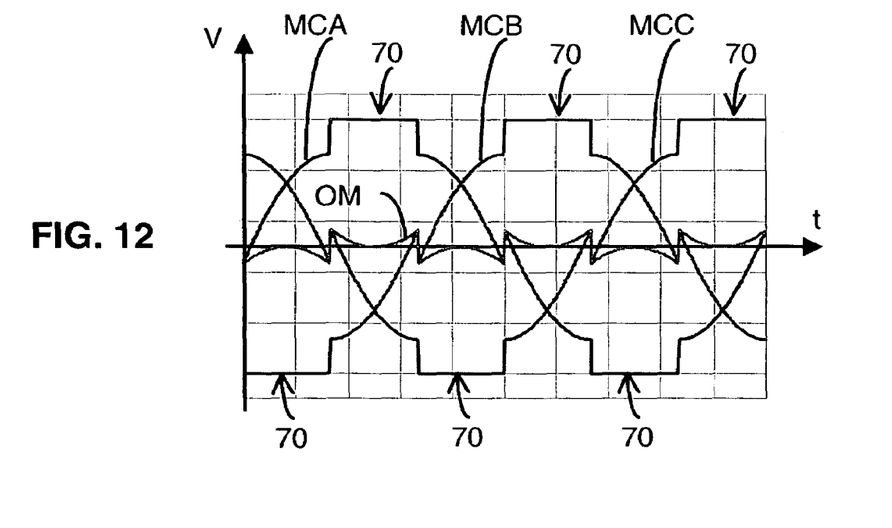
FIG. 12 illustrates a type of over-modulation signal applicable to a general control component.

FIG. 12 represents a type of inverter leg modulation and over-modulation signals applicable to a general control component. Signals MCA, MCB, MCC are three-phase signals comprising a flat over-modulation 70 on the sine wave peak. The general control component signal OM is determined according to the modulation signals MCA, MCB, MCC. In this case, this general component OM compensates over-modulation to restore a sine wave shape by low level modulation on the other legs.

Figure 13A:
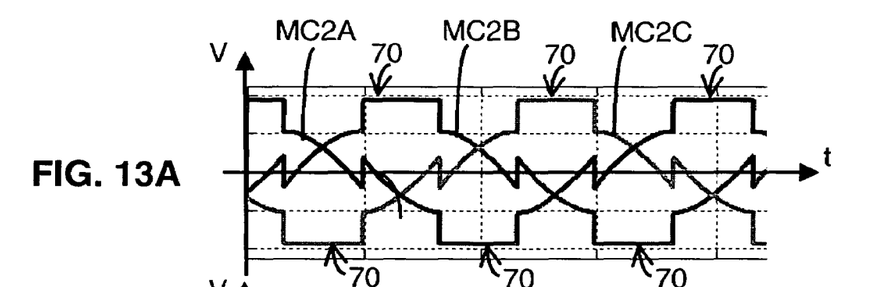
FIGS. 13A to 13C represent modulation signals comprising a general control component in a control device according to an embodiment of the invention.
Figure 13B:
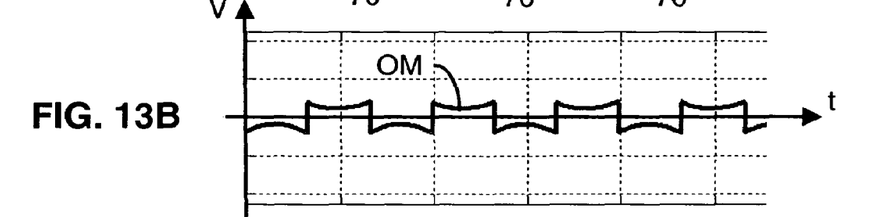
Figure 13C:
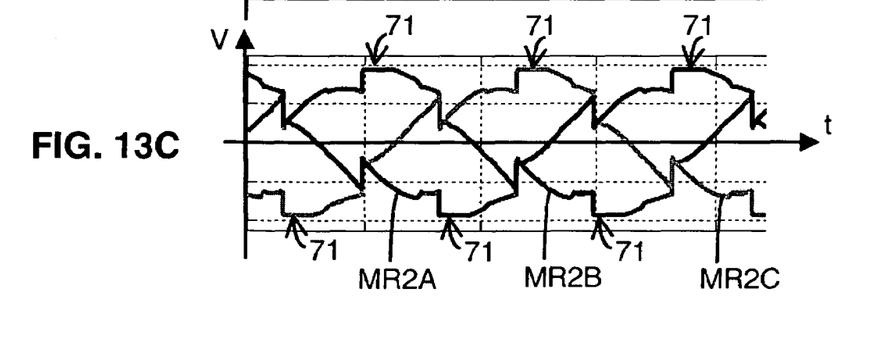

FIG. 13A shows modulation signals MC2A, MC2B, MC2C to modulate inverter leg control. FIG. 13B shows general control component signals OM generated according to the inverter modulation signals that have priority. FIG. 13C represents rectifier leg modulation signals MR2A, MR2B, MR2C also comprising an over-modulation but whose voltage forms are not synchronised with those of the inverter. On the non-priority rectifier modulation signals not playing a part in constituting the general control component, saturations 71 may occur.

Figure 14:
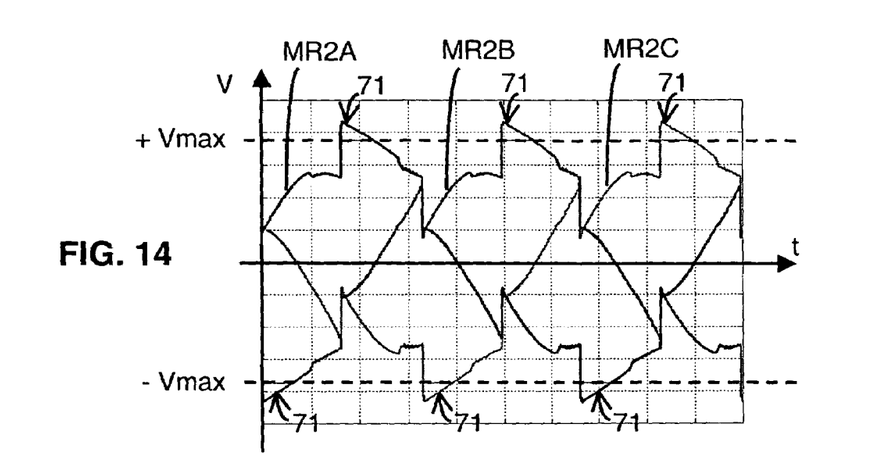
FIG. 14 represents rectifier leg control saturation signals.

FIG. 14 represents signals showing an example of rectifier leg control saturation. The modulation signals MR2A, MR2B and MR2C are also representative of the rectifier voltage input signals. When the modulation signals exceed a limit saturation value Vmax a risk of saturation 71 is possible. The voltage Vmax, is also representative of or depends on the voltage of the DC voltage VDC lines or the reference voltage V2. Saturation values can be defined by the difference between the limit value Vmax and the values of the first rectifier leg modulation signals MR1A, MR1B and MR1C.

Figure 15A:
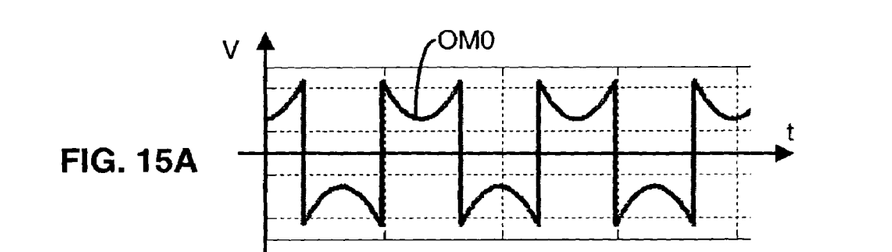
FIGS. 15A to 15C, 16A to 16C and 17A to 17C illustrate examples of signals showing general control component correction.
Figure 15B:
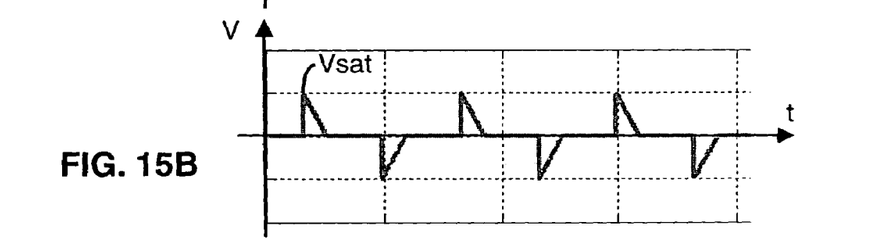
Figure 15C:
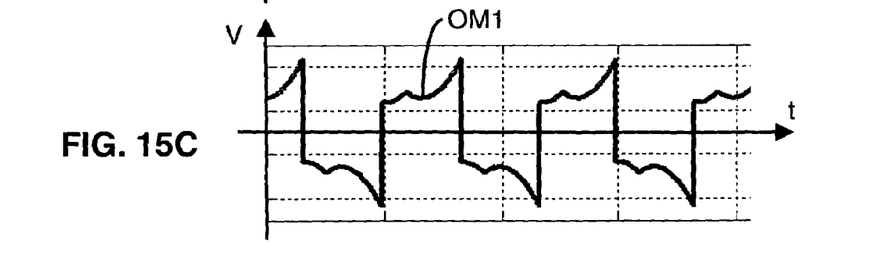

To reduce or eliminate this saturation risk, the general control component can advantageously be corrected in particular according to the saturation values. FIG. 15A shows a first general control component OM0 determined according to first inverter modulation signals MC1A, MC1B, MC1C. FIG. 15B shows an example of saturation value signals Vsat determined according to the first general control component OM0 and the first rectifier leg modulation signals MR1A, MR1B and MR1C. FIG. 15C shows a second general control signal OM1 corrected according to the saturation value signals.

Figure 16A:
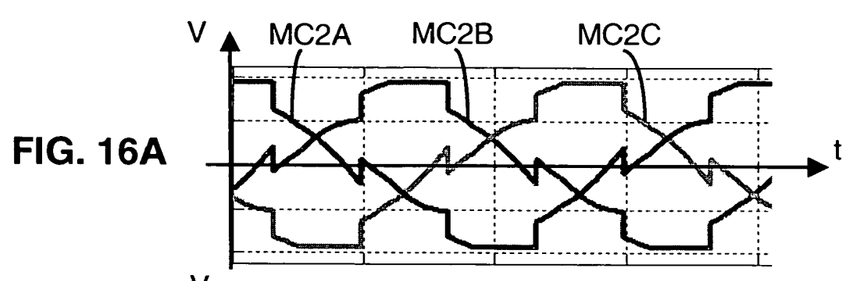
Figure 16B:
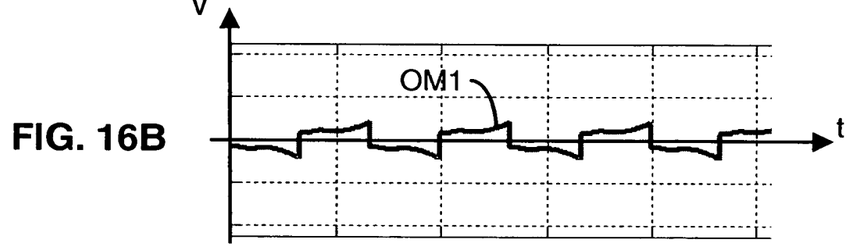
Figure 16C:
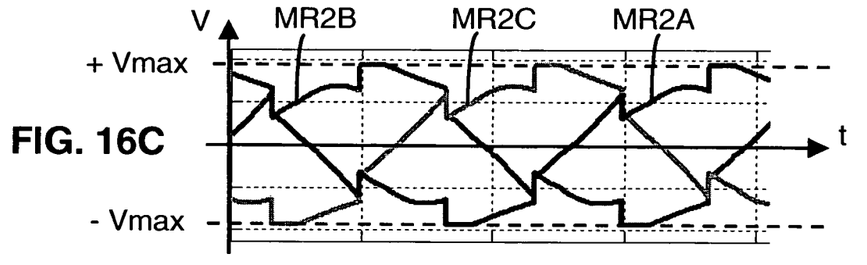
Figure 17A:
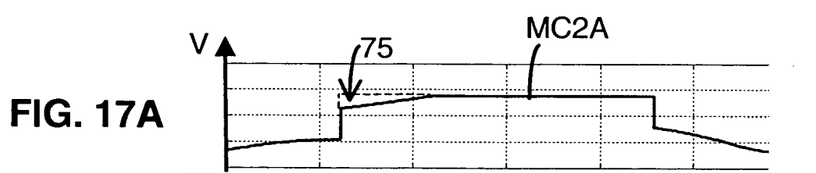
Figure 17B:
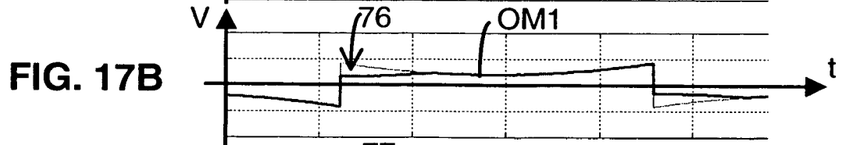
Figure 17C:
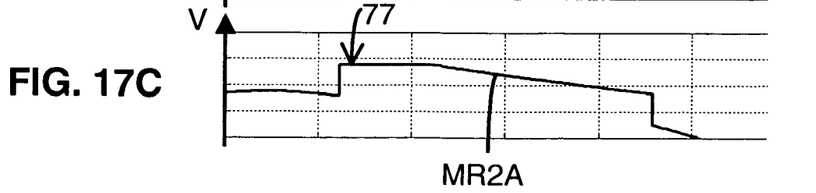

FIG. 16A shows inverter leg modulation signals MC2A, MC2B, MC2C comprising over-modulation corrected with a corrected second general control component signal OM1. An example of the form of a corrected second general control component signal OM1 is represented in FIG. 16B. FIG. 16C shows corrected modulation signals MR2A, MR2B, MR2C limited to a maximum value Vmax according to correction of the general control component. FIGS. 17A to 17C represent signals equivalent to the signals of the corresponding FIGS. 16A to 16C. In FIG. 17A, the signal MC2A comprises a clipped part 75 corresponding to correction of the general control component OM1. In FIG. 17B, the general control component signal OM1 comprises a clipped part 76 corresponding to correction to eliminate or reduce the effects of saturation risks. FIG. 17C shows in detail a limited part of the modulation signal MR2A of a rectifier leg.

Conversion devices according to embodiments of the invention can in particular be uninterruptible power supplies, speed regulators, uni-directional or bi-directional power converters between two electric power distribution systems able to have very different electrical characteristics, or frequency converters. The common neutral line LN can be connected to an earth conductor depending on the types of power systems or installation protective devices. This connection LN can itself be a ground or earth conductor or a common reference line between the converter input and output.

The semi-conductors of these converters are advantageously insulated gate transistors called IGBT but other types of semi-conductors can be used. The legs can comprise several semi-conductors connected in series and/or in parallel depending on the voltages, currents or electric powers used. For example, the input or output voltages can range from a few tens of volts to a thousand volts for low-voltage system applications or have voltages of several thousand volts in particular in medium voltage applications. The input or output currents can range from a few amperes to more than a thousand amperes.

Another application of a converter according to the invention can be electric power transformation, in particular for replacement of medium voltage—low voltage, low voltage—low voltage or medium voltage—medium voltage transformers.

In technical language the "legs" of the converter can also be called arms, stages, or a similar term.

The invention claimed is:

1. An electric power converter device with control means for controlling semiconductor stages of the electric power converter, said electric power converter comprising:
   rectifying means for receiving an input electric voltage or current and for supplying a DC voltage on intermediate DC voltage lines,
   DC voltage filtering means connected to the intermediate lines,
   conversion means for converting said DC voltage into output AC voltages, said conversion means having at least two stages connected between said DC voltage lines and outputs,
   a common neutral or earth conductor connected between the input and at least one of said outputs,
   a common stage comprising electronic power components connected between said intermediate DC voltage lines and said common neutral conductor, and
   said control means for controlling said at least two stages of the conversion means and said common stage, said control means comprising processing means, said processing means for outputting an over-modulation control signal for over-modulating at least said common stage of said electric power converter,
   wherein said processing means are for receiving control signals corresponding to the at least two stages of the conversion means and said common stage, applying a reference voltage to said control signals, modulating said control signals, and outputting modulated control signals to said at least two stages of the conversion means,
   said processing means are for outputting a signal for controlling said common stage, said signal for controlling said common stage being based on said reference voltage and said over-modulation control signal, and
   the reference voltage has a value between voltage values of the respective intermediate DC voltage lines.

2. A device according to claim 1 wherein:
   the control means control the at least two stages of the conversion means, stages of the rectifying means, and the common stage,
   the processing means supply modulation signals for each stage according to signals corresponding to said reference voltage, and
   said modulation signals modulate carrier signals of similar characteristics for each stage.

3. A device according to claim 2 wherein the signals corresponding to said reference voltage are the same for each modulated stage of the converter and the carrier signals are the same for each stage of the converter.

4. A device according to claim 2 wherein the over-modulation control signal corresponds to modulation signals of the at least two stages of the conversion means and a modulation signal of the common stage.

5. A device according to claim 4 wherein the processing means are for receiving the over-modulation control signal to process modulation signals of the stages of the rectifying means.

6. A device according to claim 5 wherein the processing means comprise correction means for correcting said over-modulation control signal according to signals corresponding to saturation of first modulation signals of the rectifying means.

7. A device according to claim 6 wherein the correction means are for forecasting saturation values and reducing a signal corresponding to the over-modulation control signal according to said saturation values.

8. An electric power converter comprising:
   rectifying means for receiving an electric voltage or current on inputs and supplying a DC voltage to intermediate DC voltage lines,
   DC voltage filtering means connected to the intermediate lines,
   conversion means for converting said DC voltage into output AC voltages and having at least two stages connected between said DC voltage lines and outputs,
   a common neutral conductor, ground or earth connection between an input and an output,
   a common stage having electronic power components connected between said intermediate DC voltage lines and the common connection,
   control means for controlling the at least two stages of said conversion means and said common stage, and comprising processing means for supplying modulated signals to said at least two stages of said conversion means and said common stage, wherein said processing means are for over-modulating at least one of said modulated signals to the at least two stages of said conversion means and to said common stage.

9. A converter according to claim 8, wherein the modulated signals supplied from the processing means to the at least two stages of the conversion means and to the common stage correspond to voltages different from the respective input voltages of the rectifying means.

10. A converter according to claim 8, wherein the modulated signals supplied to the at least two stages of the conversion means and to the common stage have a different fundamental frequency from the fundamental frequency of the input voltage signal of the rectifying means.

11. A converter according to claim 8, wherein the modulated signals supplied to the at least two stages of the conversion means and to the common stage have different phases from the phases of the input voltage of the rectifying means.

12. A converter according to claim 8, wherein said control means control the at least two stages of said conversion means and the stages of the rectifying means in reversible manner, such that outputs to a load become power inputs, the conversion means become rectifying means, and the inputs become outputs to supply AC electric power.

13. A control process of an electric power convener comprising:
    receiving an electric input voltage or current at a rectifying means,
    rectifying said electric input voltage or current with said rectifying means,
    supplying a DC voltage from said rectifying means to intermediate DC voltage lines,
    filtering such DC voltage with a DC voltage filtering means connected to the intermediate lines,
    converting such DC voltage into output AC voltages with a conversion means having at least two stages connected between said intermediate DC voltage lines and outputs,
    connecting a common neutral conductor, ground, or earth connection between an input and an output,
    connecting a common stage between said intermediate DC voltage lines and the common neutral conductor, ground, or earth connection, said common stage comprising electronic power components,
    controlling the at least two stages of the conversion means with control means, said control means comprising processing means, and
    supplying modulated signals of control signals of the at least two stages of the conversion means and of the common stage,
    said process of the processing means comprising:
        determining first modulation signals for controlling the at least two stages of the conversion means,
        applying a reference voltage to a modulation signal of the common stage and to modulation signals for controlling the at least two stages of the conversion means,
        determining an over-modulation control signal value,
        generating an over-modulation control signal, and
        applying said over-modulation control signal to said common stage modulation signal and to modulation signals for controlling the at least two stages of the conversion means.

14. The process according to claim 13 comprising: applying a reference voltage and the over-modulation control signal to modulation signals for controlling stages of the rectifying means.

15. The process according to claim 14 comprising:
    detecting saturation of modulation signals for controlling stages of the rectifying means, and
    correcting the over-modulation control signal value according to the detection of saturation of the modulation signals of stages of the rectifying means.

* * * * *